United States Patent
Kovath

(10) Patent No.: US 7,475,885 B2
(45) Date of Patent: Jan. 13, 2009

(54) BASKET ATTACHMENT FOR A SHOPPING CART

(76) Inventor: Jeanne Kovath, 4316 Eagle Rock Pl., St. Charles, MO (US) 63304

(*) Notice: Subject to any disclaimer, the term of this patent is extended or adjusted under 35 U.S.C. 154(b) by 0 days.

(21) Appl. No.: 11/893,397

(22) Filed: Aug. 16, 2007

(65) Prior Publication Data
US 2008/0042380 A1    Feb. 21, 2008

Related U.S. Application Data

(60) Provisional application No. 60/822,555, filed on Aug. 16, 2006.

(51) Int. Cl.
*B60R 9/00* (2006.01)
(52) U.S. Cl. .............. 280/33.992; 280/33.991; 280/33.994; 280/33.993
(58) Field of Classification Search ............ 280/33.991, 280/33.992
See application file for complete search history.

(56) References Cited

U.S. PATENT DOCUMENTS

| | | | |
|---|---|---|---|
| 3,361,438 A * | 1/1968 | Davis .................... 280/33.991 |
| 4,376,502 A * | 3/1983 | Cohen ......................... 224/411 |
| 4,702,402 A | 10/1987 | Ferri |
| 5,203,578 A | 4/1993 | Davidson et al. |
| 5,263,578 A | 11/1993 | Narvey |
| 5,494,308 A * | 2/1996 | Southerland ........... 280/33.992 |
| 5,617,982 A * | 4/1997 | Wilson ....................... 224/411 |
| 6,056,178 A * | 5/2000 | Rapp-Duncan ............. 224/411 |
| 6,406,041 B1 * | 6/2002 | Rea ......................... 280/33.992 |
| 6,450,513 B1 * | 9/2002 | Bernstein ............... 280/33.992 |
| 6,966,565 B1 | 11/2005 | Ryan et al. |

\* cited by examiner

*Primary Examiner*—Christophe Ellis
*Assistant Examiner*—Cynthia F. Collado
(74) *Attorney, Agent, or Firm*—James Ray & Associates

(57) ABSTRACT

A device for mounting on a shopping cart that holds small items being purchased which otherwise could fall through openings in the shopping cart while shopping. The device includes a basket member made from a predetermined material and having a predetermined configuration. There is at least one aperture formed through a wall of the basket member. There is also a mechanism connectable through the at least one aperture and an opening between bars of a sidewall of the shopping cart for mounting the basket member one of inside and outside such shopping cart on one of the bars.

14 Claims, 3 Drawing Sheets

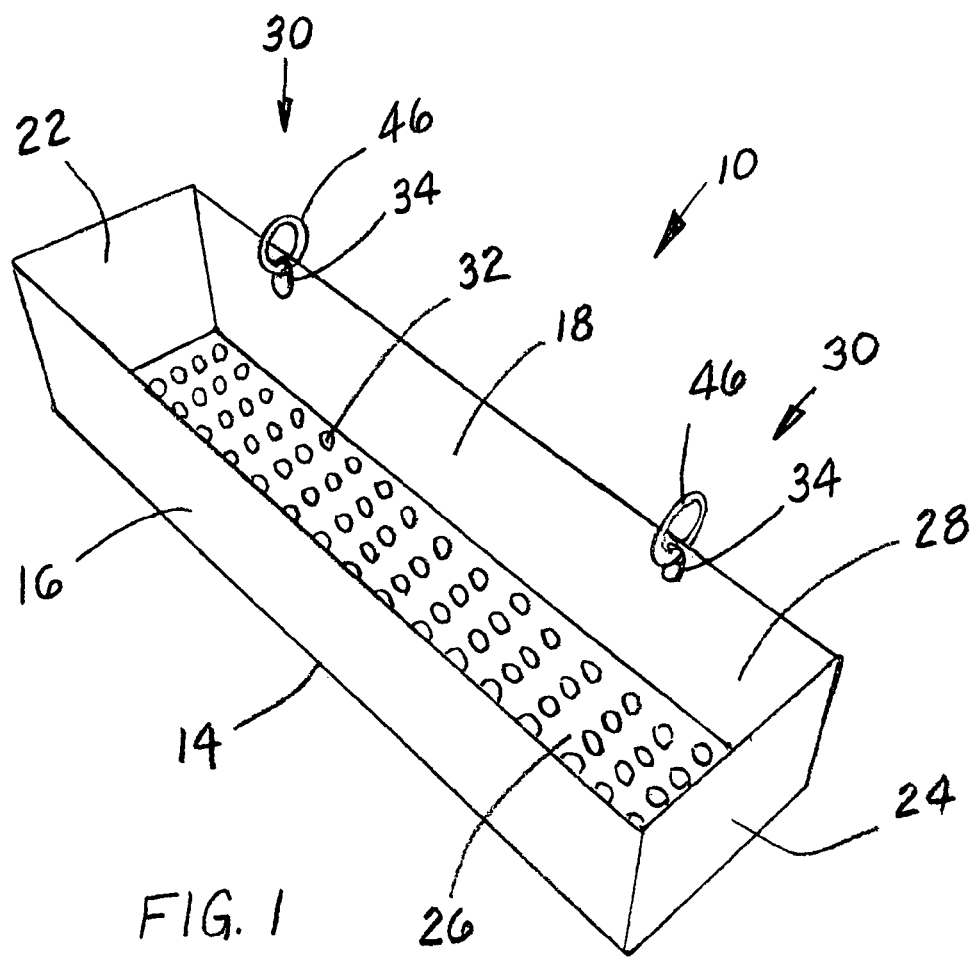
FIG. 1
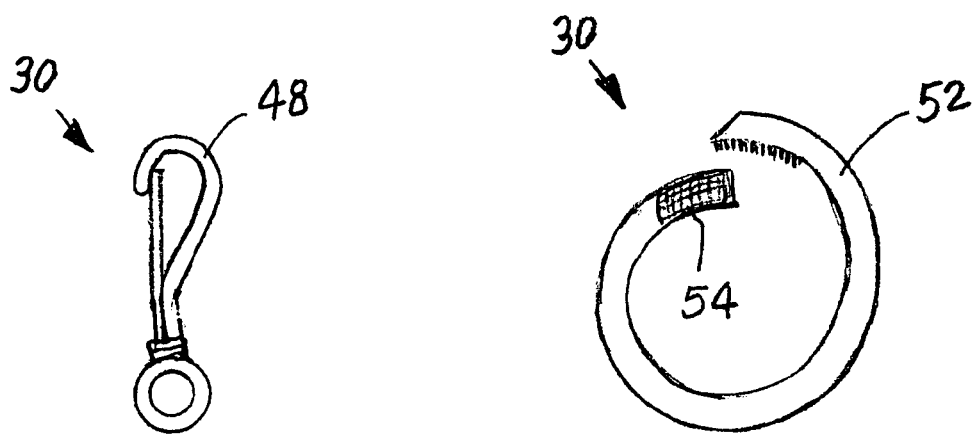
FIG. 1a
FIG. 1b

BASKET ATTACHMENT FOR A SHOPPING CART

CROSS REFERENCE TO RELATED APPLICATION

This application is closely related to and claims priority from U.S. Provisional Patent Application Ser. No. 60/822,555 filed on Aug. 16, 2006.

FIELD OF THE INVENTION

The present invention relates, in general, to various types of baskets used to hold items being purchased from a store and, more particularly, the invention relates to a basket for mounting on a shopping cart that holds small items being purchased which otherwise could fall through openings in such shopping cart while shopping.

BACKGROUND OF THE INVENTION

Hand held baskets and shopping carts have been in existence for many years, prior to the conception and development of the present invention, as is generally well known in the prior art.

Grocery, pharmacy and hardware store shoppers alike often struggle with trying to keep small item purchases from falling through the rather large openings in a shopping cart, or keeping fragile items from being damaged by larger and heavier items also being purchased.

With a material reduction in packaging, many items in small or individual wrappings such as lipstick, seasoning packets, gum and other candies can fall through the large openings in a shopping cart without being noticed by the consumer.

SUMMARY OF THE INVENTION

The present invention provides a device for mounting on a shopping cart that holds small items being purchased which otherwise could fall through openings in such shopping cart while shopping. The device includes a basket member made from a predetermined material and having a predetermined configuration. There is at least one aperture formed through a wall of the basket member. There is also a means connectable through the at least one aperture and an opening between bars of a sidewall of such shopping cart for mounting the basket member one of inside and outside the shopping cart on one of such bars.

OBJECTS OF THE INVENTION

It is, therefore, one of the primary objects of the present invention to provide a basket that attaches to a shopping cart for holding small items which otherwise could fall through openings in the shopping cart while shopping.

Another object of the present invention is to provide a basket that is easily attached to a shopping cart.

A further object of the present invention is to provide a shopping cart basket attachment that is relatively easy to manufacture.

Still another object of the present invention is to provide a shopping cart basket attachment that is relatively inexpensive to make.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

BRIEF DESCRIPTION OF THE DRAWINGS

FIG. 1 is a perspective view of a shopping cart basket attachment according to a presently preferred embodiment of the present invention wherein at least one ring member is used to attach the basket to the shopping cart;

FIG. 1a is a perspective view of a clip member that can be used as an alternative means of attaching the basket, illustrated in FIG. 1, to a shopping cart;

FIG. 1b is a perspective view of a strip of fabric having mating small hook and loop type fasteners that can be used as another means of attaching the basket, illustrated in FIG. 1, to a shopping cart;

Figure 2:
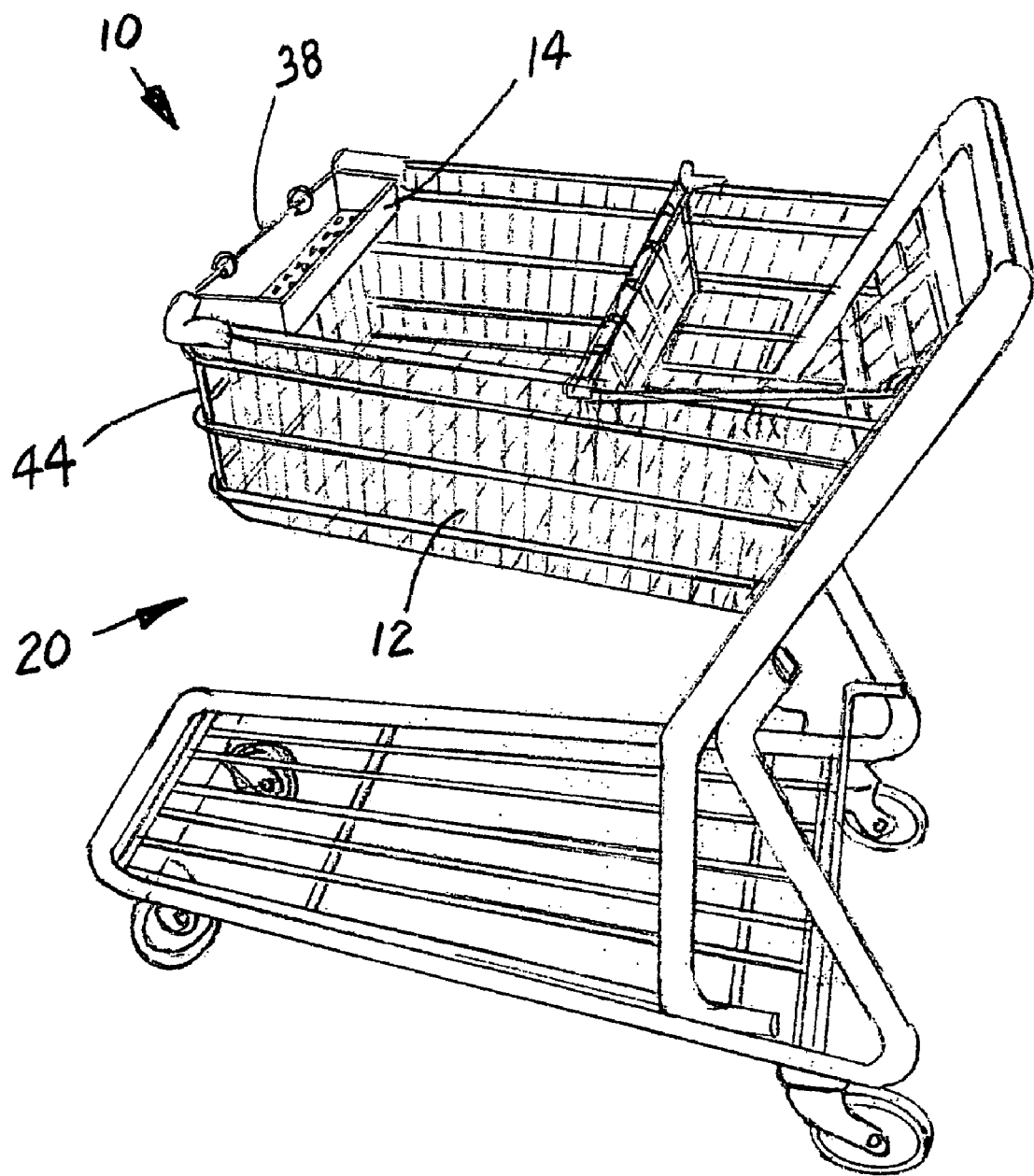
FIG. 2 is a perspective view of the basket, illustrated in FIG. 1, attached in an upright position inside a shopping cart.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 3:
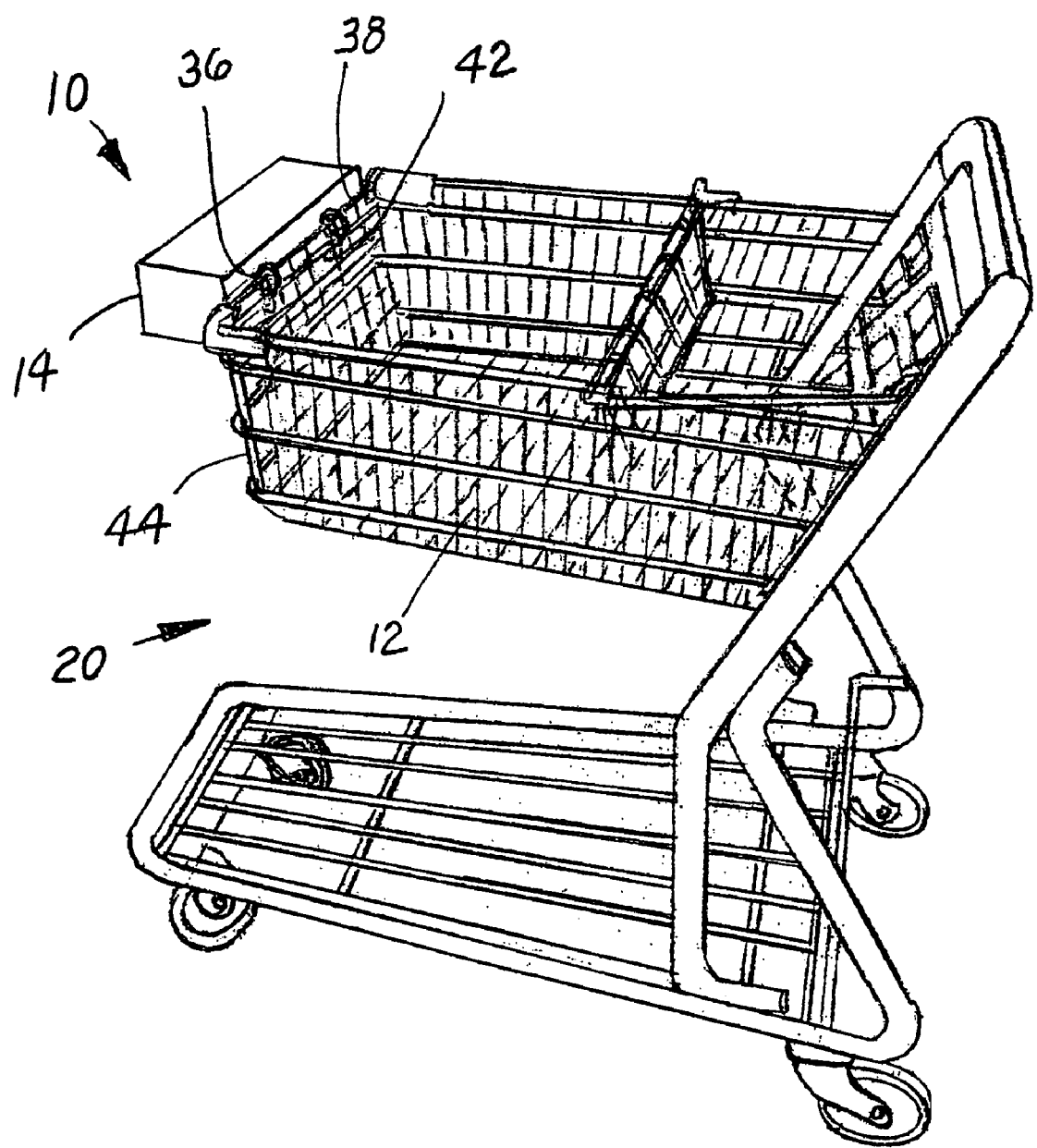
FIG. 3 is a perspective view of the basket, illustrated in FIG. 2, after being rotated 270° from inside to outside the shopping cart.

Reference is now made, more particularly, to drawing FIGS. 1 through 3. Illustrated therein is a device, generally designated 10, for mounting on a shopping cart, generally designated 20. Device 10 will have a predetermined configuration suitable for holding small items (not shown) being purchased at a store which otherwise could fall through the openings 12 in the shopping cart 20 while shopping.

Device 10 includes a basket member 14, preferably, made from either plastic or metal. Basket member 14, preferably, has a substantially rectangular configuration with substantially parallel front and rear walls 16 and 18, respectively, two substantially parallel side walls 22 and 24 and a bottom wall 26 forming a chamber 28 therein.

Basket member 14 will preferably have a length of between about 10 inches and about 14 inches, a width of between about 2 inches and 4 inches and a height of between about 2 inches and 4 inches. Also, in a presently preferred embodiment, bottom 26 of basket member 14 includes a pre-selected number of drainage holes 32 therethrough, which will allow moisture within basket member 14 to escape.

Device 10 also includes at least one aperture 34 formed through a wall, preferably rear wall 18, of basket member 14. A means, generally designated 30, is connectable through the at least one aperture 34 and an opening 36 between bars 38 and 42 (shown in FIG. 3) of a sidewall 44 of shopping cart 20 for mounting basket member 14 one of inside and outside shopping cart 20 on bar 38.

Means 30 includes one of a ring member 46, a clip member 48 (shown in FIG. 1a) and a strip of fabric 52 having mating small hook and loop type fasteners 54 (shown in FIG. 1b). In a preferred embodiment, means 30 will be ring member 46 made of either plastic or metal.

In a presently preferred embodiment of the present invention, rear wall 18 of basket member 14 will include two apertures 34 formed therethrough. Accordingly, there will be two ring members 46 used to attach basket member 14 to shopping cart 20.

Any of the possible means 30 described above will allow basket member 14 to swing from inside to outside on bar 38 of shopping cart 20 and vice versa depending on a position a customer would want basket member 14 to be without having to manipulate means 30 once basket member 14 is mounted.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. A device, for mounting on a shopping cart, that holds small items being purchased which otherwise could fall through openings in said shopping cart while shopping, said device comprising:
   (a) a basket member made from a predetermined material and having a predetermined configuration, said basket member being mounted within an interior portion of said shopping cart when said device is in use and outside such interior of said shopping cart when said device is not in use;
   (b) at least one aperture formed through a wall of said basket member; and
   (c) a connection means connectable through said at least one aperture and an opening between bars of a sidewall of said shopping cart for flipping and retaining said basket member one of inside and outside said shopping cart on one of said bars without requiring removal of said connection means when flipping said basket member.

2. A device, according to claim 1, wherein said predetermined material used to make said basket member is one of plastic and metal.

3. A device, according to claim 1, wherein said predetermined configuration of said basket member is substantially rectangular with substantially parallel front and rear walls, two substantially parallel side walls and a bottom wall forming a chamber therein.

4. A device, according to claim 3, wherein said basket member has a length of between about 10 inches and about 14 inches, a width of between about 2 inches and 4 inches and a height of between about 2 inches and 4 inches.

5. A device, according to claim 3, wherein said bottom wall of said basket member includes a pre-selected number of drainage holes therethrough which allow moisture within said basket member to escape.

6. A device, according to claim 3, wherein said at least one aperture is formed through said rear wall of said basket member.

7. A device, according to claim 6, wherein said means includes one of a ring member, a clip member and a strip of fabric having mating small hook and loop type fasteners.

8. A device, according to claim 7, wherein said means includes a ring member.

9. A device, according to claim 8, wherein said ring member is made of one of plastic and metal.

10. A device, according to claim 6, wherein said rear wall of said basket member includes two apertures formed therethrough.

11. A device, according to claim 10, wherein said means includes one of two ring members, two clip members and two strips of fabric having mating small hook and loop type fasteners.

12. A device, according to claim 11, wherein said means includes two ring members.

13. A device, according to claim 12, wherein said ring members are made of one of plastic and metal.

14. A device, according to claim 1, wherein said means allows said basket member to swing from inside to outside said shopping cart and vice versa depending on a position a customer would want said basket member to be without having to manipulate said means once said basket member is mounted.

* * * * *